(12) United States Patent
Fan

(10) Patent No.: US 7,950,637 B2
(45) Date of Patent: May 31, 2011

(54) ADJUSTABLE HOLDING APPARATUS

(76) Inventor: Eagle Fan, Hsinchu (TW)

( * ) Notice: Subject to any disclaimer, the term of this patent is extended or adjusted under 35 U.S.C. 154(b) by 990 days.

(21) Appl. No.: 11/777,452

(22) Filed: Jul. 13, 2007

(65) Prior Publication Data
US 2009/0014487 A1   Jan. 15, 2009

(51) Int. Cl.
*B25B 1/20*   (2006.01)
(52) U.S. Cl. ............ 269/45; 269/3; 269/6; 269/95
(58) Field of Classification Search ............ 269/45, 269/3, 6, 95; 248/310, 313, 316.4, 346.07, 248/229.22; 294/104, 34; 403/361; 446/120–122, 446/124, 127, 128
See application file for complete search history.

(56) References Cited

U.S. PATENT DOCUMENTS

| | | | | |
|---|---|---|---|---|
| 307,178 A | * | 10/1884 | Carter | 269/45 |
| 744,559 A | * | 11/1903 | Kendrick | 409/225 |
| 1,684,925 A | * | 9/1928 | Perlmutter | 248/346.07 |
| 1,728,718 A | * | 9/1929 | Bell | 269/95 |
| 2,190,577 A | * | 2/1940 | Tinnerman | 403/357 |
| 2,713,471 A | * | 7/1955 | Hirsch | 248/346.03 |
| 2,862,745 A | * | 12/1958 | Deliso | 403/334 |
| 2,887,079 A | * | 5/1959 | Wilson | 269/9 |
| 2,936,803 A | * | 5/1960 | Jorick, Jr. | 269/45 |
| 2,969,250 A | * | 1/1961 | Kull | 403/350 |
| 3,645,569 A | * | 2/1972 | Reilly | 403/4 |
| 4,125,251 A | * | 11/1978 | Jamieson, Jr. | 269/45 |
| 4,641,819 A | * | 2/1987 | Poland | 269/45 |
| 6,040,514 A | * | 3/2000 | Liao | 84/421 |
| 6,811,131 B2 | * | 11/2004 | Kuo | 248/346.03 |
| 7,374,158 B2 | * | 5/2008 | Deming | 269/41 |
| 7,422,202 B2 | * | 9/2008 | Wu | 269/303 |
| 7,611,132 B2 | * | 11/2009 | Ben-Gigi | 269/6 |
| 7,815,178 B1 | * | 10/2010 | Troutman | 269/43 |

FOREIGN PATENT DOCUMENTS
WO   WO 9009827 A1 * 9/1990
* cited by examiner

*Primary Examiner* — George Nguyen
(74) *Attorney, Agent, or Firm* — Rabin & Berdo, P.C.

(57) ABSTRACT

An adjustable holding apparatus is provided, including a base unit, a clapping unit, and at least two stopping units. The base unit includes a surface on which the electronic device can be placed. The clapping unit is partially embedded in the base unit, and can move in the direction parallel to the surface of the base unit. The clapping unit includes a clapping part. The clapping part is located on one side of the clapping unit vertically. The stopping units are located at the lower part of the base unit with a distance separating the two stopping units. Each stopping unit includes a stopping part located at the upper part of stopping unit, and is off-center. The clapping part of the clapping unit and the stopping parts of the stopping units are located on the opposite sides of the surface of the base unit to form a three-point clapping on the device placed on the surface. The clapping units and the stopping units can be adjusted to accommodate a wide range of objects.

4 Claims, 7 Drawing Sheets

ADJUSTABLE HOLDING APPARATUS

FIELD OF THE INVENTION

The present invention generally relates to a holding apparatus for electronic devices, and more specifically to an apparatus providing various clapping ranges of different width, length, and shape for application to hold various electronic devices.

BACKGROUND OF THE INVENTION

A wide range of portable electronic devices are becoming a part of the modern daily life for most people, such as mobile phones, PDA, MP4, GPS, and so on. As most of the electronic devices are not standard options to the majority of the vehicles, the driver usually needs an additional holder to hold the electronic devices in place so that the use of these electronic devices will not interfere with the driving. However, as these electronic devices come in different sizes and shapes, a conventional holder may not be able to accommodate the different designs easily. For the user, the ideal holding apparatus should be small in size, and yet with a wide clapping range so as to hold electronic devices of various sizes as well as accommodate future electronic products.

Conventional holders available in the market use a structure of two clapping arms on both sides to clap an electronic device. In this structure, one or two moveable clappers are installed in the holding seat. The clappers can move towards or away from each other for holding or releasing the electronic device. With this structure, the clapping range is restricted; for example, if the clapping position is not centered for the devices with long shape, the center of mass may be easily shifted, and the device slides off the clapping. Therefore, larger devices, such as audiovisual players, cannot be easily held. The holding apparatus of the present invention uses at least three clapping points to hold the device so that the center of mass of the device can be easily maintained in the accommodation area, and the holding apparatus can provide a firmer holding.

SUMMARY OF THE INVENTION

The primary object of the present invention is to provide an adjustable holding apparatus. The adjustable holding apparatus can provide holding space of various widths or shapes. At least three clapping points are used to hold the device as to provide a firmer holding on the device.

Another object of the present invention is to provide an adjustable holding apparatus with a wide clapping range. By using a moveable clapping unit and at least two turnable stopping units to provide clapping for holding electronic devices of a variety of thickness and width. The stopping units include a stopping part. The stopping part is located off-center to the stopping unit, and when the stopping unit turns, the position of the stopping part changes. Therefore, the clapping points of the holding apparatus of the present invention provide a plurality of variations. Because the difference between the widest and the smallest clapping ranges is large, the holding apparatus can be applied to hold devices ranging from small mobile phones to large-screen GPS.

To achieve the above objects, the present invention provides an adjustable holding apparatus, including a base unit, a clapping unit, and at least two stopping units. The base unit includes a surface on which the electronic device can be placed. The clapping unit is partially embedded in the base unit, and can move in the direction parallel to the surface of the base unit. The clapping unit includes a clapping part. The clapping part is located on one side of the clapping unit vertically. The stopping units are located at the lower part of the base unit with a distance separating the two stopping units. Each stopping unit includes a stopping part located at the upper part of stopping unit, and is off-center. The clapping part of the clapping unit and the stopping parts of the stopping units are located on the opposite sides of the surface of the base unit for clapping the device placed on the surface.

The foregoing and other objects, features, aspects and advantages of the present invention will become better understood from a careful reading of a detailed description provided herein below with appropriate reference to the accompanying drawings.

BRIEF DESCRIPTION OF THE DRAWINGS

The present invention can be understood in more detail by reading the subsequent detailed description in conjunction with the examples and references made to the accompanying drawings, wherein.

DETAILED DESCRIPTION OF THE PREFERRED EMBODIMENTS

Figure 1:
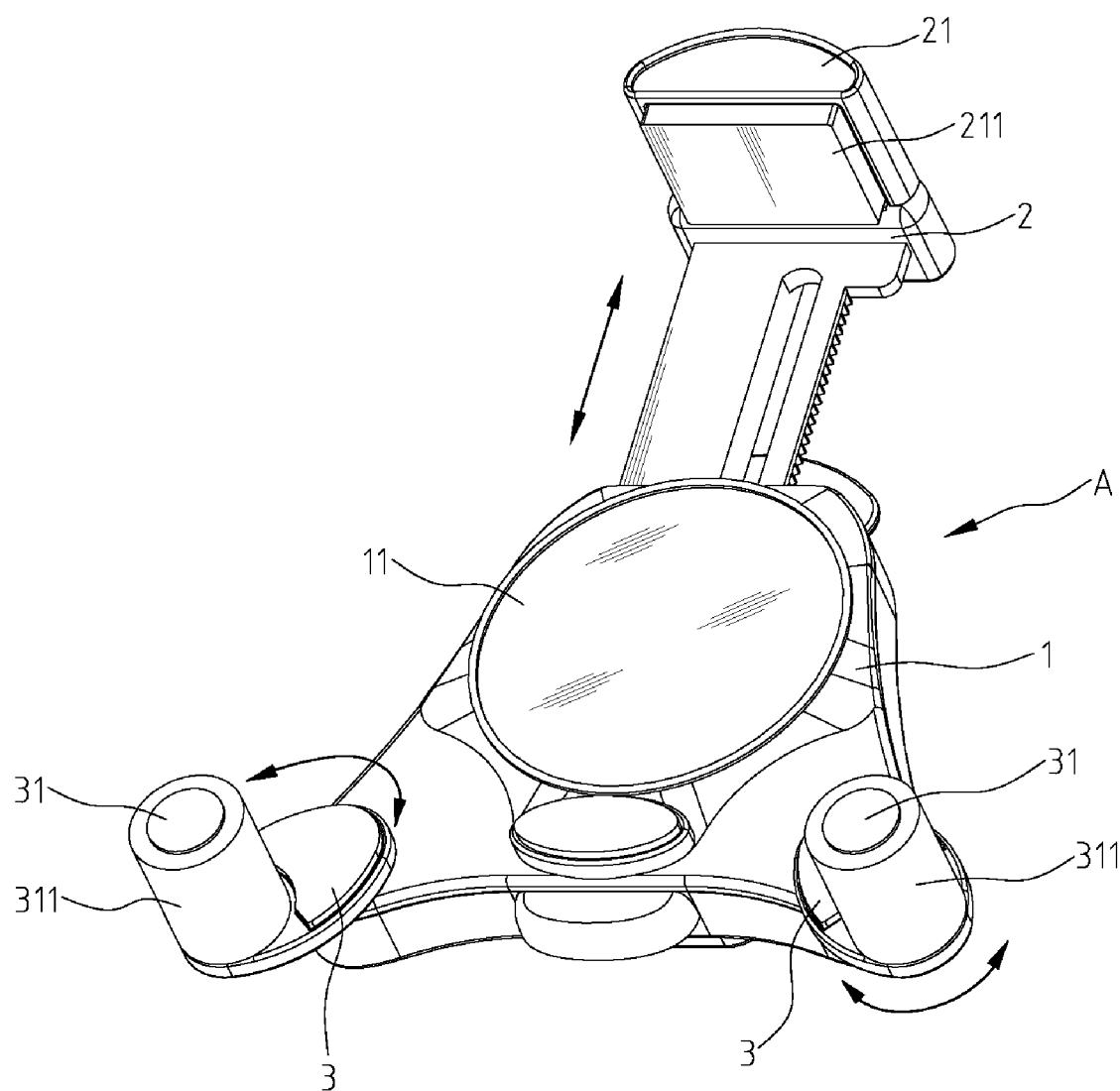
FIG. 1 shows a 3D schematic view of the present invention.
Figure 2:
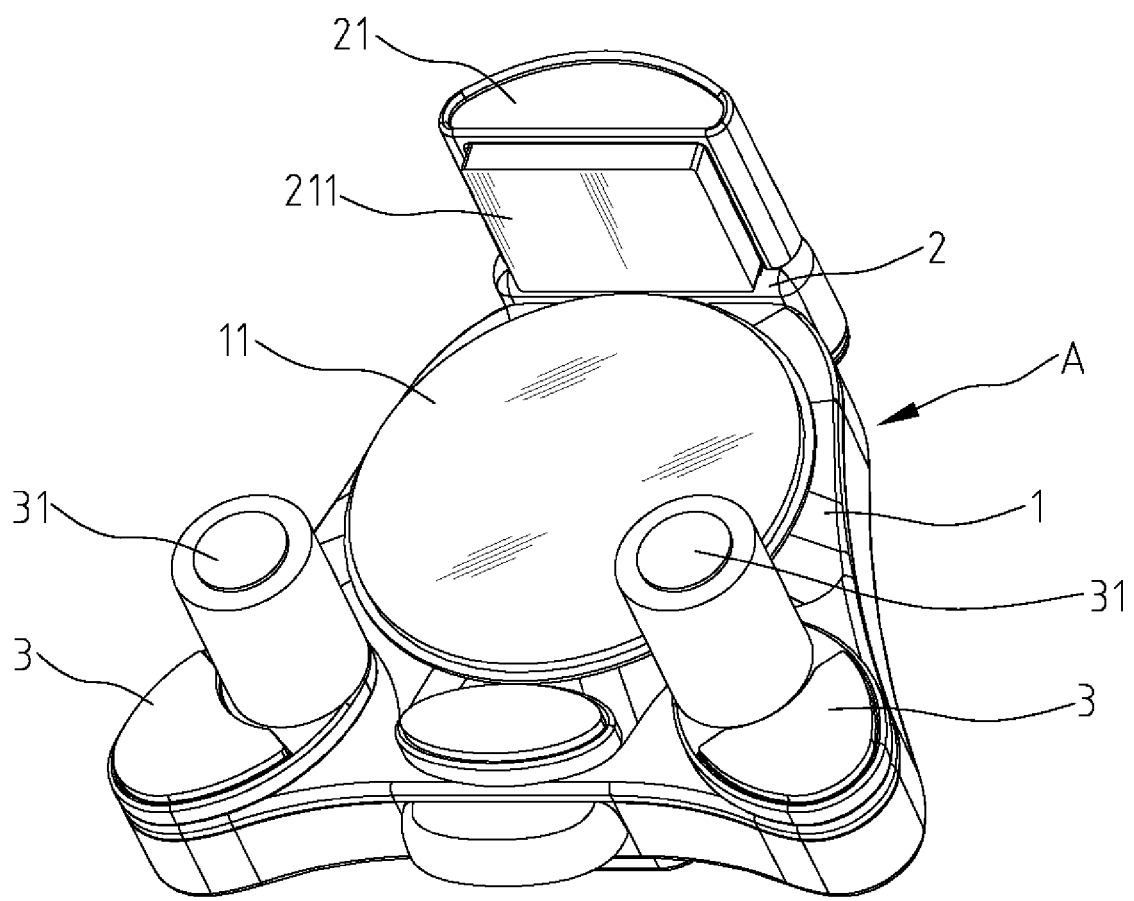
FIG. 2 shows a schematic view of the embodiment in FIG. 1 with the positions of the clapping unit and stopping units changed.

FIG. 1 shows a 3D schematic view of the present invention. A holding apparatus A of the present invention includes a base unit 1, a clapping unit 2, and at least two stopping units 3. Base unit 1 has a large-area surface 11 on which an object can be placed. Base unit 1 includes sufficient internal space to house other structural mechanism and parts. Clapping unit 2 partially extends into the internal space of base unit 1. Clapping unit 2 also utilizes the mechanism housed inside the internal space of base unit 1 so that clapping unit 2 can move in the direction parallel to surface 11. The operational mechanism to moving clapping unit 2 is similar to the mechanism used in the conventional products, and the detailed description is omitted here. Clapping unit 2 includes a clapping part 21, and clapping part 21 is located vertically on one side of clapping unit 2. The height of clapping part 21 is higher than surface 11 so that clapping part 21 can clap the object placed on surface 11. Stopping units 3 are located on the two sides of the lower part of base unit 1. Each stopping unit 3 is separated from other stopping units 3 with a distance. Stopping unit 3 includes stopping part 31. Stopping part 31 is located vertically on the upper part of stopping unit 3, and is off-center to stopping unit 3. Stopping parts 31 and clapping part 21 are located on the opposite sides of surface 11 so as to form a three-point clapping on the object placed on surface 11. Stopping units 3 are not completely fastened to base unit 1. Stopping units 3 can adjust the position by rotation. As shown in FIG. 2, the rotation of stopping units 3 can change the position of stopping parts 31. Holding apparatus A of the present invention uses stopping parts 31 whose positions are adjustable, and moveable clapping part 21 to vary the clapping points so that the range, shape and size of the objects that can be clapped can vary. Also, by using at least three-point clapping, the holding to the object is stronger. In addition, a sponge sheath 311 can be used to cover stopping part 31 and a sponge pad can be placed on the inner wall of clapping part 21 to increase the friction of the clapping on the object.

Figure 3:
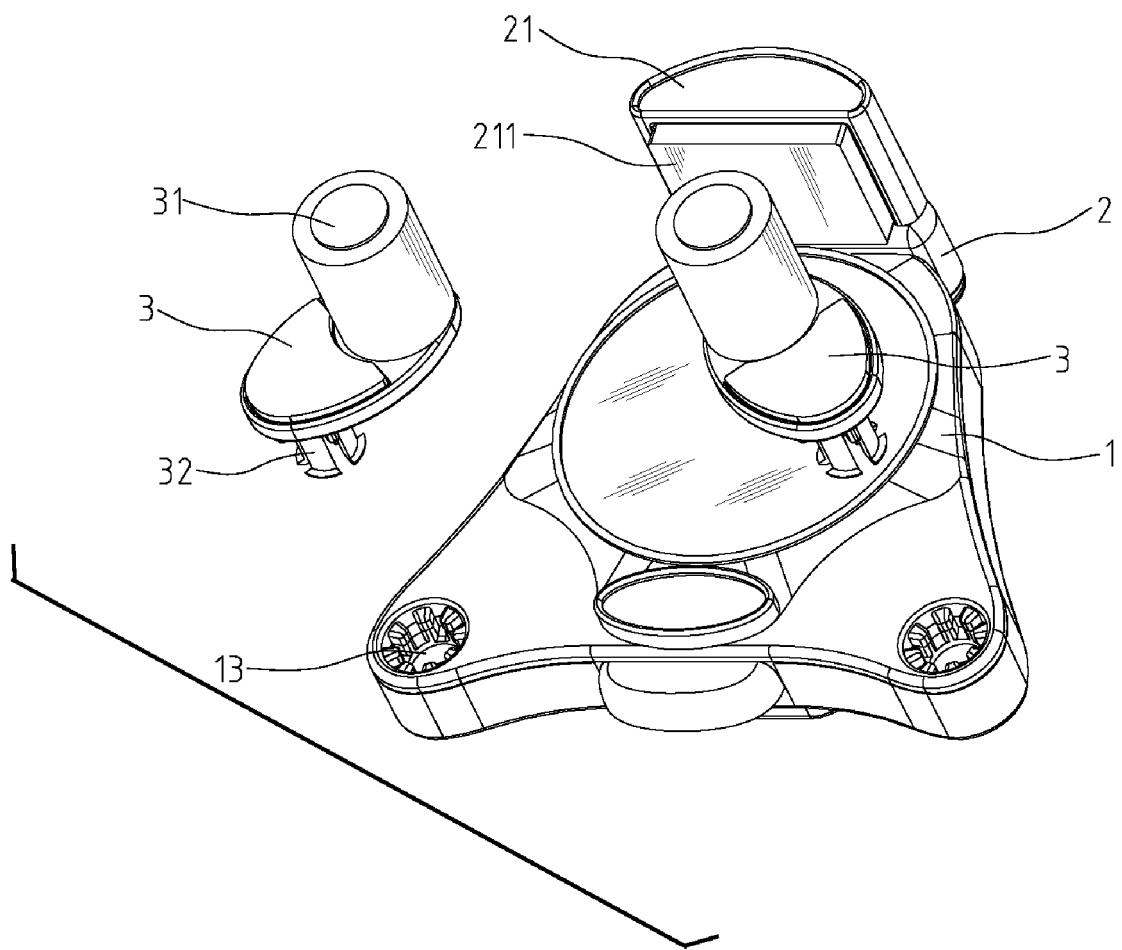
FIG. 3 shows a partial exploded view of the present invention.
Figure 4:
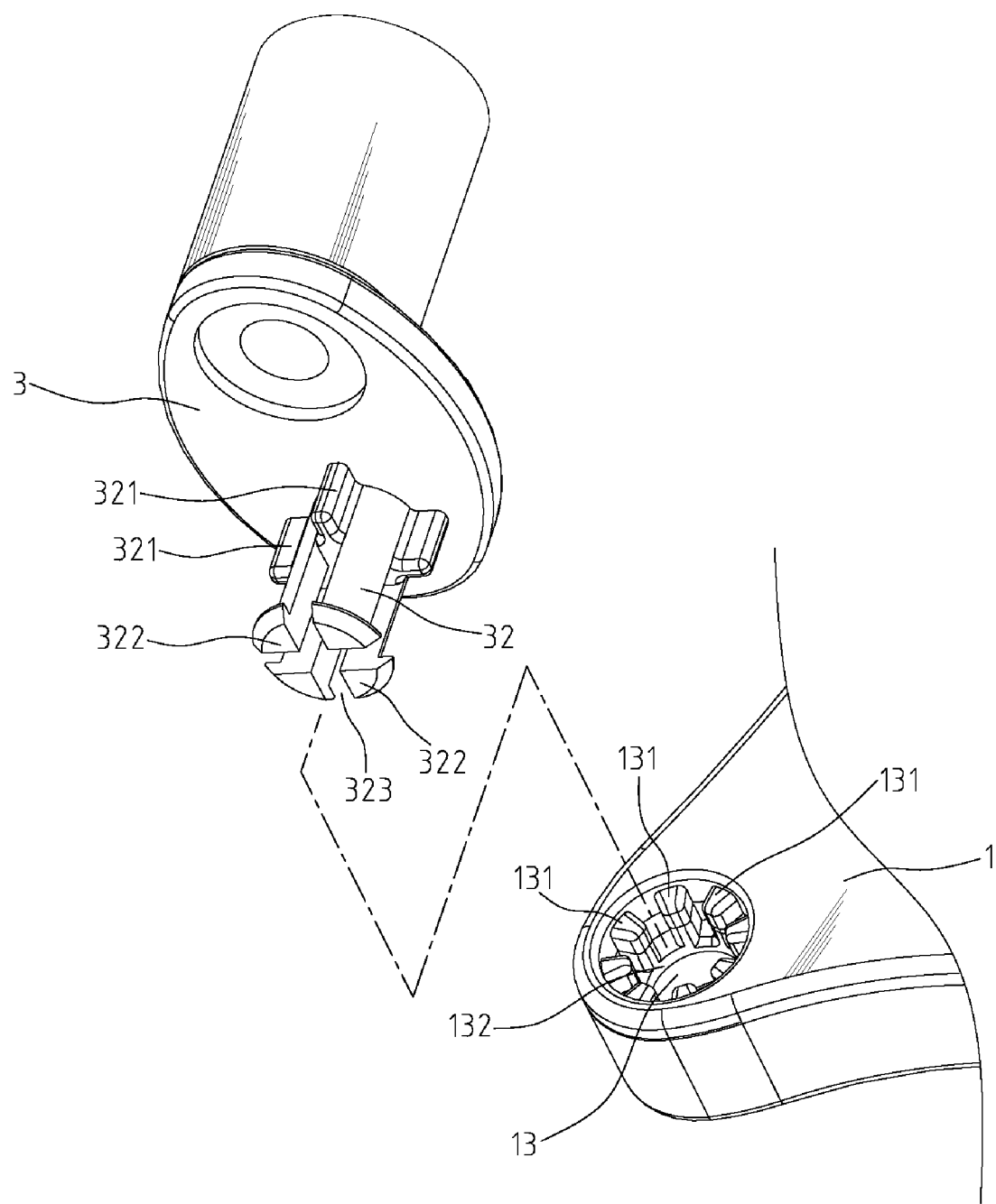
FIG. 4 shows an enlarged schematic view of the stopping unit and engaging trench of the present invention.

FIG. 3 shows a partial exploded view of the present invention. Although stopping unit 3 is located at the lower part of base unit 1, the rotation of stopping unit 3 can adjust the clapping position to accommodate different shapes and sizes of objects. There are many rotation mechanisms that can be used in the present invention, and the present embodiment only shows one possible rotation mechanism for description. In the present embodiment, the lower part of base unit 1 includes engaging trenches 13. As shown in FIG. 4, the upper part of engaging trench 13 has a specific shape, mainly including a plurality of protruding blocks 131 on the inner edge of the trench wall. In this embodiment, the shape of the trench is like a gear. The lower part of stopping unit 3 includes an engaging part 32 protruding vertically. The upper part of engaging part 32 includes a plurality of blocks 321 evenly distributed around the circumference. The embodiment shows four blocks 321. When assembled, each of four blocks 321 is stuck between two neighboring protruding blocks 131. Because there are 8 protruding blocks 131, the present embodiment provides 8 positions for the rotation of stopping unit 3. To adjust the position of stopping unit 3, stopping unit 3 is slightly pulled to disengage blocks 321 of engaging part 32 from protruding blocks 131 of engaging trench 13. Then, stopping unit 3 is turned to a new position, and pushed so that blocks 321 of engaging part 32 is engaged to and fastened to protruding blocks 131 of engaging trench 13. By using the above rotation mechanism, stopping units 3 can be adjusted and fixed to base unit 1. The shape of engaging trench 13 is not limited to the above embodiment, i.e., a gear, other shapes can also be used as long as the corresponding engaging part 32 has a matching shape.

Figure 5:
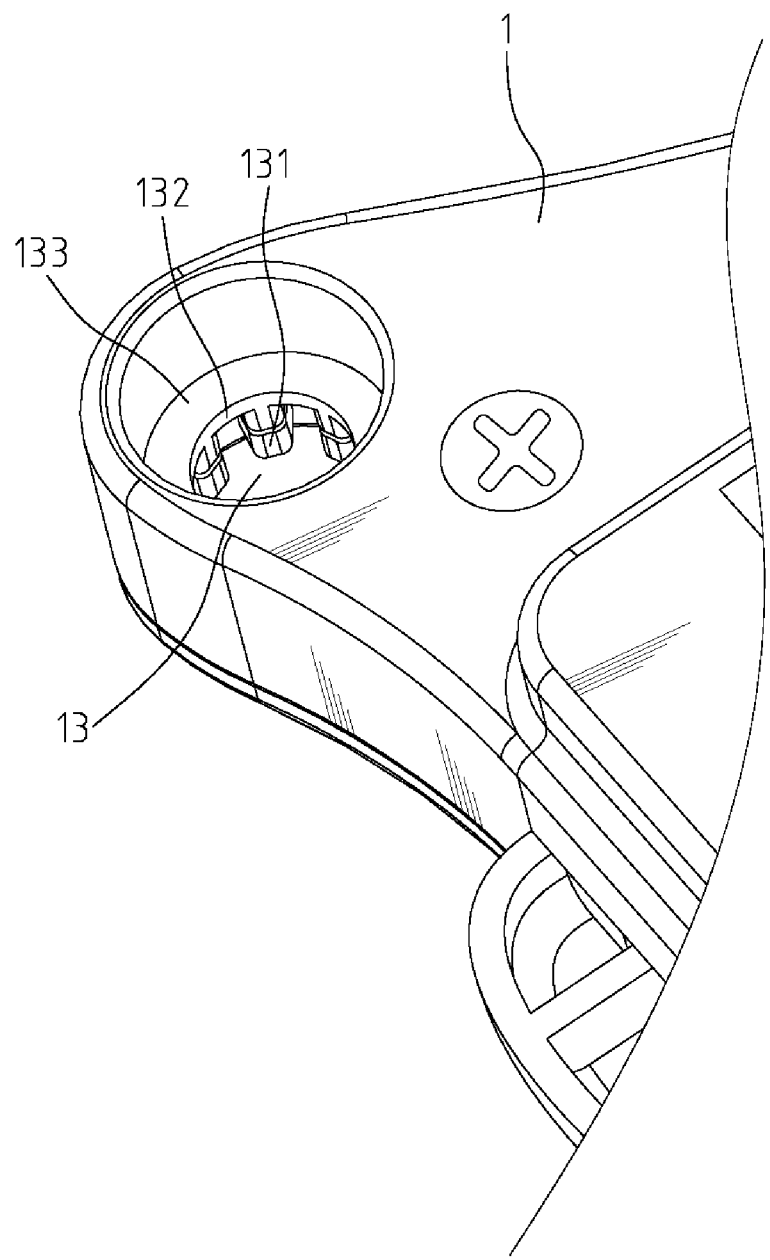
FIG. 5 shows an enlarged schematic view of the engaging trench on the back of base unit of the present invention.

To make the adjustment of stopping unit 3 more convenient, the structures of engaging trench 13 and engaging part 32 can be designed. For example, the upper part of the trench wall of engaging trench 13 forms the shape of a gear trench, and the lower part of the trench wall forms a smooth circular hole 132 with a smaller diameter. As shown in FIG. 5, the depth of engaging trench is slightly shallower. As shown in FIG. 4, in addition to blocks 321, engaging part 32 can further include a plurality hooking elements 322. Blocks 321 are distributed along the circumference of the upper part of engaging part 32, and the lower part of engaging part 32 includes a cross trench 323. The outer circumference of the lower part of engaging part 32 matches circular hole 132, and the length is longer than the depth of engaging trench 13. Hooking element 322 is a small protruding element formed on the bottom of engaging part 32. When assembled, the lower part of engaging part 32 is slightly compressed so that hooking element 322 passing through circular hole 132 and engaged to bottom surface 133 of engaging trench 13, as shown in FIG. 5. With this engagement, engaging part 32 is fastened to engaging trench 13. As described, engaging part 32 is longer than the depth of engaging trench 13; therefore, engaging part 32 can be slightly pulled from the fastened engagement without entirely breaking away from engaging trench 13. When pulled to the top position, blocks 321 are disengaged from protruding blocks 131 so that engaging part 32 can rotate to adjust the position, and then be pushed down for engagement and fastening.

Figure 6:
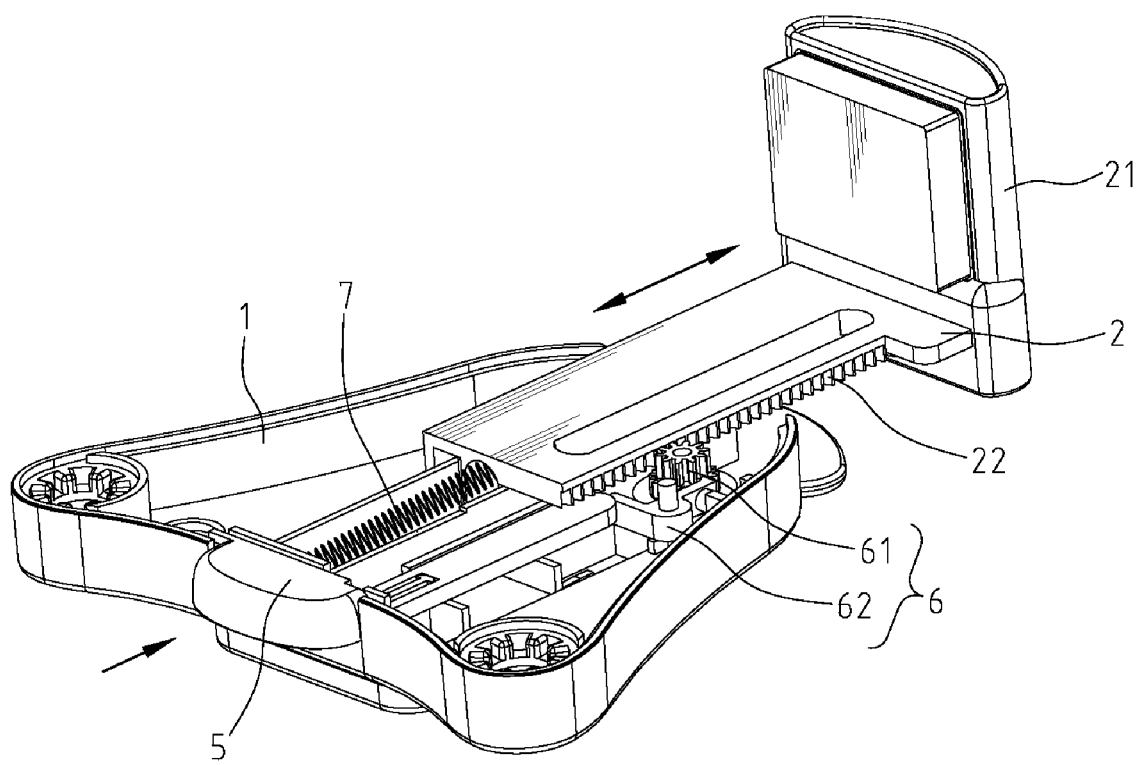
FIG. 6 shows a schematic view of the internal structure of the base unit of the present invention.

FIG. 6 shows a schematic view of the internal structure of the base unit of the present invention. The mechanism inside base unit 1 is for the movement and the fixation of clapping unit 2. The mechanism includes a releasing unit 5, a fixing unit 6, and a spring 7. Clapping unit 2 cam move for a short distance within base unit 1, and includes a gear rack 22. Spring 7 provides the force for pushing clapping unit 2 outward. Fixing unit 6 includes a gear 61, and a snap element 62. Gear 61 is for fitting to gear rack 22 of clapping unit 2. Snap element 62 is for locking gear 61 in place so that gear 61 will not roll. Releasing unit 5 can move for a short distance laterally. When releasing unit 5 is pressed, snap element 62 is triggered to release the locking so that clapping unit 2 can move outward by the force of spring 7.

Figure 7:
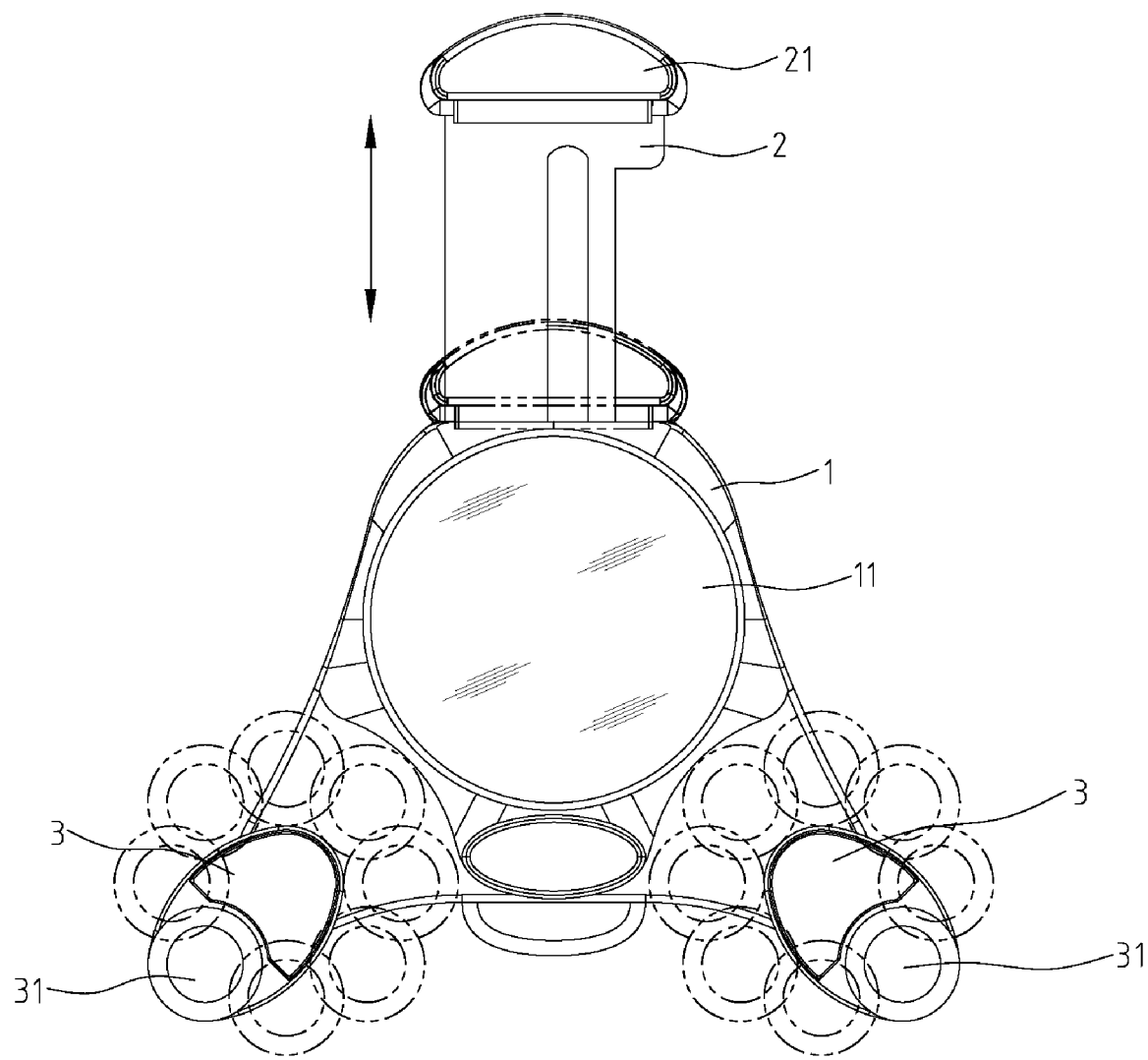
FIG. 7 shows a front view of the present invention.

FIG. 7 shows a front view of the present invention. Holding apparatus A of the present invention uses at least three clapping points to hold the object. The three-point clapping is provided by at least two stopping parts 31 of stopping units 3 and one clapping part 21 of clapping unit 2. Because the position of stopping part 31 is off-center to stopping unit 3, the position of stopping part 31 will change when stopping unit 3 rotates. The dash lines in FIG. 7 shows the possible positions for stopping parts. As shown in FIG. 7, the distance between two stopping parts 31 can vary, and when collaborating with moveable clapping part 21, the clapping range can vary even farther. Therefore, the three-point clapping of the present invention provides a clapping range that is adjustable to hold a wide variety of objects.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:
1. An adjustable holding apparatus, comprising:
a base unit, having a flat surface for placing an object, a lower part of said base unit having at least two engaging trenches, an upper part of each said engaging trench comprising a plurality of protruding blocks distributed as a ring, with each said engaging trench forming a specific shape;
a clapping unit, partially extending into said base unit for moving inwards and outwards relative to said base unit, and having a clapping part on one side; and
at least two stopping units, located at the lower part of said base unit, able to rotate for adjustment, and each having a stopping part located on an upper part of said stopping unit, said stopping part being off-center of said stopping unit, said stopping units and said clapping unit being on opposite sides of said flat surface of said base unit, and when said stopping unit is rotating, a position of said stopping part is also changing, each said stopping unit further comprising an engaging part, said engaging part protruding from a lower part of said stopping unit and being engaged to said engaging trench when assembled, said engaging part further comprising a plurality of blocks distributed as a ring on an upper part of said engaging part, so that when assembled, said blocks of said engaging part are engaged between two neighboring protruding blocks of a respective engaging trench.

2. The holding apparatus as claimed in claim 1, wherein a lower part of said engaging trench is a wall forming a circular hole, a length of said engaging part is longer than a depth of engaging trench for allowing a short-distance upward and downward movement, a lower part of said engaging part comprises a vertical trench, an outer circumference of the lower part of said engaging part matches the wall of said circular hole, and a the bottom of said engaging part comprises protruding hooking elements.

3. The holding apparatus as claimed in claim 1, wherein the shape of said engaging trench can be a circular gear, pentagon, hexagon, or other shape with a shape matching said engaging part.

4. The holding apparatus as claimed in claim 1, wherein an inside of said base unit houses other mechanisms for moving said clapping unit and fixing said clapping unit in place.

* * * * *